Nov. 21, 1939.　　　　M. GALETTI　　　　2,180,673
ARTICULATOR
Filed Jan. 15, 1937

Inventor
MARIO GALETTI
By Young, Emery & Thompson
Attorneys

Patented Nov. 21, 1939

2,180,673

UNITED STATES PATENT OFFICE 2,180,673

ARTICULATOR

Mario Galetti, Milan, Italy

Application January 15, 1937, Serial No. 120,789
In Italy January 31, 1936

3 Claims. (Cl. 32—32)

The present invention relates to dental articulators.

It has already been proposed to provide a dental articulator in which two articulated sections, each adapted to support a plaster model, are connected together by a connecting rod, one end of which is coupled to one section by a ball and socket joint while the stem of the connecting rod is slidably and rotatably mounted in a support attached to the other section.

The object of the present invention is to effect improvements in the adjustable connections between the connecting rod, the support and the section of the articulator attached to the support.

This object is attained by the arrangement according to the present invention in which the support carries a rotatable ring, which is retained thereon by means of a flange provided on said support and is pivotally connected by a fork joint to said other section. The support preferably comprises an inner part provided with a clamp screw and an outer part in the form of an external sleeve, both of which parts are formed with openings through which the stem of the connecting rod extends, the arrangement being such that tightening of the clamp screw not only clamps the stem to the support, but also clamps the rotatable ring against the retaining flange and thereby fixes the support, the connecting rod and the rotatable ring in the relative positions to which they have previously been adjusted.

A constructional embodiment of the articulator according to the present invention will now be described by way of example with reference to the accompanying drawing in which.

Figures 1, 2:
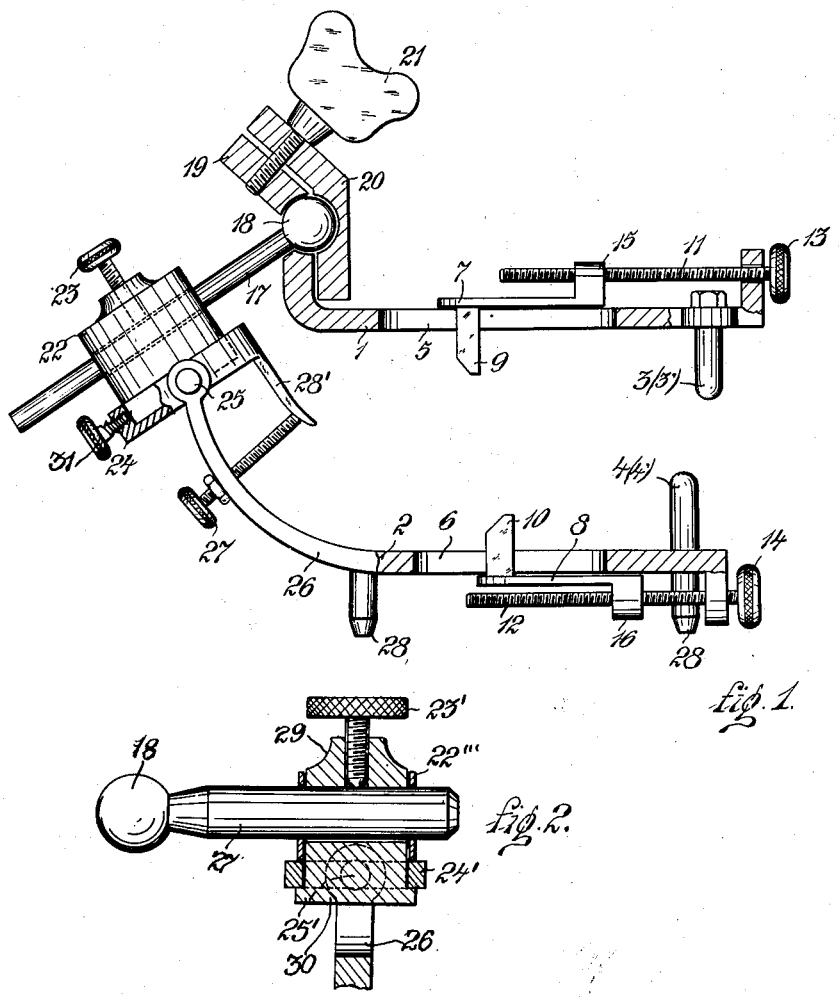
Fig. 1 shows a vertical longitudinal section of the articulator.
Fig. 2 shows a section of an optional refinement.

Referring to Fig. 1, the sections of the articulator have the form of two plates 1, 2 provided on their internal surfaces with a pair of fixed abutments 3, 3' and 4, 4' respectively, located close to their external edges. The plates 1, 2 are formed with openings 5, 6 in which are slidably arranged sliders 7, 8, each provided with an abutment movable with it under the action of screws 11, 12 which can be actuated by means of milled heads 13, 14 and which are threaded in female screw-threaded members 15, 16 integral with the sliders 7, 8. The lower plate is also provided with projecting abutment members or feet on its under side 28.

This arrangement enables each model to be fitted and secured with rapidity against the internal surface of the corresponding section of the articulator, by bringing the movable abutments 9, 10 opposite the corresponding models the other edges of which are supported against the fixed abutments on their respective sections.

In order to make possible a similar rapid and accurate regulation of the correct position of articulation of the two models, the connection between the two sections of the articulator is effected by a device comprising two universal joints separated from one another by an adjustable distance. This device includes a rod 17 terminating in a ball 18 which engages in two socket parts having spherical surfaces formed in a prolongation 19 of the upper plate 1 and in a part 20 which can be fitted on and secured to the said prolongation by means of a screw 21 so as to confine the ball 18 forcibly, whereby the mutual attachment can be made rigid as soon as the parts have been set in the correct relative positions. The stem of the rod 17 is slidably arranged in a support 22 which forms part of the other universal joint and the position of the rod 17 in this support can be fixed with the aid of a clamp screw 23. The support 22 can rotate within a ring 24 pivotally mounted at 25 on an extension 26 integral with the lower plate 2. A second clamp screw 31, threaded radially in the ring 24, serves to hold the support in fixed position in the ring 24. In this way a universal joint is attained since the support 22 can rotate within the ring 24 and the latter can rotate about the pivot 25 which is arranged at right angles to the axis of the sleeve. It is therefore possible to arrange the axis of the rod 17, and consequently the upper plate 1, in any desired position.

In order to limit the angular movement of the upper section relative to the lower section, the known arrangement may be made use of whereby a regulating screw 27 threaded in an extension 26 in the plate 2 acts as an adjustable abutment for a projection 28' integral with the ring 24 and therefore with the plate 1 through the multiple joint described above. In order to remove any possibility of play in the pivot 25, the plain open pivot may be replaced in known manner by mounting between two conical points arranged on opposite sides and provided with screw adjustment means.

Fig. 2 shows an improved constructional form of the connecting support, comprising an external part or sleeve 22''' which can rotate on the ring 24' and an internal part 29 the end 30 of which forms a flange adjacent the ring 24'. The hole through the part 29 is of somewhat oval cross section so that the rod 27' has a small amount of play when the clamp screw 23' is in its upper position. The ring 24' rotates about the pivot 25' provided on the lower plate 2 and consequently the sleeve or external part 22'''' can rotate on the ring 24' which rotates about an axis normal to that of the pivot pin 25'. The clamp screw 23' serves both for fixing the rod 27' and for preventing movement of the sleeve 22'''' on the ring 24'. When the screw 23' is tightened, the rod 27' is lowered together with the external part 22'''', so that the ring 24' is compressed between the internal part 29 and the flange 30 and all rotational movement is prevented, and the rod 27' is fixed by the screw against the interior wall of the part 29. Hence the axis of the rod 27' with fixed ball head 18' can be fixed in any required direction and the upper plate can be caused to assume any desired position on said head.

Obviously all the parts described may be constructed and arranged differently, or replaced by other analogous and equivalent members without exceeding the scope of the present invention.

What I claim is:

1. In a dental articulator comprising two articulated sections each adapted to support a plaster model, a rod connected by means of a ball and socket joint at one of its ends to one of said sections, a support for the second section in which support said rod is slidably and rotatably engaged, a ring rotatably retained on said support, and means connecting the ring to the second section, said means being pivoted to the ring about an axis at right angles to the axis of rotation of the ring, the support for the second section having an inner member encircled by said ring, an outer ring member, said inner support member being encircled by said first-mentioned ring member, both the support member and said outer ring member being formed with openings through which the connecting rod extends, and said support member having also a clamp screw arranged to clamp said rod to the support and to clamp the ring members against rotation thereon.

2. An adjustable dental articulator, comprising a pair of shanks, a connecting rod for holding the shanks together, said rod having at one end a ball-joint connection with one of the shanks, a bearing member on the other shank, in which member the other end of said rod is mounted for displacement and oscillation; said member being constructed as a bearing box provided with a bottom flange and a ring relatively revoluble with regard to each other, said second shank having a bifurcated end engaging with said ring in such a manner that a connection is provided between the ring and the second shank which permits relative turning between the bearing box and the second shank in two planes perpendicular to each other.

3. An adjustable articulator in accordance with claim 2, in which the bearing member consists of an inner body portion having a clamp screw-threaded therein and an outer sleeve around said body portion, alined borings being provided through said body portion and sleeve for said rod, said clamp screw being adapted for securing said rod in position, thereby causing said sleeve to press the ring against said flange, thus simultaneously locking the movable parts of the bearing member rigidly on said rod.

MARIO GALETTI.